US009466908B2

(12) United States Patent
Ohkubo et al.

(10) Patent No.: US 9,466,908 B2
(45) Date of Patent: Oct. 11, 2016

(54) CONNECTOR

(71) Applicant: YAZAKI CORPORATION, Tokyo (JP)

(72) Inventors: Yoshitaka Ohkubo, Shizuoka (JP); Yoshitake Ohmori, Shizuoka (JP); Hajime Kato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/787,011

(22) PCT Filed: Apr. 18, 2014

(86) PCT No.: PCT/JP2014/061038
§ 371 (c)(1),
(2) Date: Oct. 26, 2015

(87) PCT Pub. No.: WO2014/175176
PCT Pub. Date: Oct. 30, 2014

(65) Prior Publication Data

US 2016/0104960 A1 Apr. 14, 2016

(30) Foreign Application Priority Data

Apr. 26, 2013 (JP) ................................ 2013-094463

(51) Int. Cl.
*H01R 13/11* (2006.01)
*H01R 13/187* (2006.01)
(Continued)

(52) U.S. Cl.
CPC ........... *H01R 13/111* (2013.01); *H01R 13/187* (2013.01); *H01R 13/42* (2013.01); *H01R 11/12* (2013.01)

(58) Field of Classification Search
CPC .. H01R 13/111; H01R 13/42; H01R 13/4226
See application file for complete search history.

(56) References Cited

U.S. PATENT DOCUMENTS 1,213,632 A * 1/1917 Swick .................... H01R 11/22 439/860
2,944,330 A * 7/1960 Swick ..................... F16B 9/023 206/820

(Continued)

FOREIGN PATENT DOCUMENTS

JP 7-45322 A 2/1995
JP 2012-169219 A 9/2012

OTHER PUBLICATIONS

English translation of the Written Opinion of the International Search Report for PCT/JP2014/061038 dated Jun. 17, 2014.
International Search Report for PCT/JP2014/061038 dated Jun. 17, 2014 with partial English translation.

*Primary Examiner* — James Harvey
(74) *Attorney, Agent, or Firm* — Kenealy Vaidya LLP

(57) ABSTRACT

A connector (11) includes a female terminal (13) having a terminal connection section (19) to which a mating male terminal (17) is electrically connected and a conductor connection section (23) and an electric insulating female-side housing (15) for holding the female terminal (13). The female terminal (13) includes a male terminal insertion/extraction opening (37) bored in the terminal connection section (19) and a plurality of spring contact pieces (41), the fixed-side ends (43) of which are fixed to the opening peripheral section of the male terminal insertion/extraction opening (37) and the free-side ends (45) of which elastically make contact with the male terminal (17) inserted into the male terminal insertion/extraction opening (37).

2 Claims, 9 Drawing Sheets

(51) Int. Cl.

| | |
|---|---|
| ***H01R 13/42*** | (2006.01) |
| *H01R 11/12* | (2006.01) |

(56) References Cited

U.S. PATENT DOCUMENTS

| | | | | | |
|---|---|---|---|---|---|
| 3,622,954 | A * | 11/1971 | Hovnanian | H01R 25/00 | 439/857 |
| 4,056,299 | A * | 11/1977 | Paige | H01R 4/4818 | 439/225 |
| 5,211,587 | A * | 5/1993 | Alden | H01R 13/111 | 439/843 |
| 6,520,812 | B1 | 2/2003 | Machado | | |
| 6,945,831 | B2 * | 9/2005 | Pereira | H01R 4/02 | 29/882 |
| 2006/0270286 | A1 * | 11/2006 | Zhao | H01M 2/206 | 439/840 |
| 2010/0159743 | A1 * | 6/2010 | Kato | H01R 13/521 | 439/587 |
| 2011/0130054 | A1 * | 6/2011 | Lamoureux | H01R 13/111 | 439/889 |
| 2015/0357748 | A1 * | 12/2015 | Ohmori | H01R 24/52 | 439/578 |
| 2016/0087351 | A1 * | 3/2016 | Ohkubo | H01R 13/187 | 439/877 |
| 2016/0104960 | A1 * | 4/2016 | Ohkubo | H01R 13/42 | 439/626 |

* cited by examiner (a)

(b)

CONNECTOR

TECHNICAL FIELD

The present invention relates to a connector.

BACKGROUND ART

As a connector, the female terminal of which is electrically connected to the male terminal of a mating connector, a shield connector disclosed in Patent Document 1 is available.

As shown in FIG. 9, a J/B (junction box) 505 covered with an aluminum cover 503 is provided with a waiting-side connector 507, and this waiting-side connector 507 faces the outside of the aluminum cover 503 through a mounting opening 509 provided in the aluminum cover 503. A shield connector 501 is fitted into the waiting-side connector 507 through the mounting opening 509 of the aluminum cover 503.

The shield connector 501 includes a housing (female-side housing) 511 that can be fitted into the waiting-side connector 507, a shield shell 513, made of metal, for covering the outer peripheral face of the housing 511, a pushing piece 515 provided on the shield shell 513 and elastically deformable, and an engaging protrusion 517 provided on the housing 511 and elastically contactable with the pushing piece 515. The shield shell 513 is made close to the side of the aluminum cover by fastening bolts, whereby the pushing piece 515 makes contact with the engaging protrusion 517 so as to push the housing 511 into the waiting-side connector 507.

The waiting-side connector 507 has a hood section 519 being open to the front side, and this hood section 519 faces the outside of the aluminum cover 503 through the mounting opening 509 in the aluminum cover 503. Inside the hood section 519, a plurality of male tab terminals (male terminal) 521 are provided. The front end sides of the tab terminals 521 are disposed so as to protrude forward from the inner wall of the hood section 519, and the rear end sides of the tab terminals 521 are connected to a circuit board (not shown) disposed inside the J/B 505.

In the shield connector 501 having the above-mentioned configuration, the tab terminal 521 enters inside from the front end opening of a female terminal 523 and elastically makes contact with an elastic contact piece 525 provided inside the female terminal 523 so as to extend in the longitudinal direction of the terminal. The tab terminal 521 is electrically connected to the elastic contact piece 525 while their contact faces make sliding contact with each other in the face direction along the insertion direction of the terminal. In this contact state, an effective contact area is secured between the tab terminal 521 and the elastic contact piece 525. Furthermore, the locking protrusion of a locking arm 527 is locked to a section 529 to be locked, whereby the housing 511 is held in a state of being normally fitted to the waiting-side connector 507.

PRIOR ART DOCUMENT

Patent Document

Patent Document 1: JP-A-2012-169219

SUMMARY OF THE INVENTION

However, in the conventional shield connector 501 described above, the tab terminal 521 made of metal is electrically connected to the elastic contact piece 525 while their contact faces make sliding contact with each other in the face direction along the insertion direction of the terminal, whereby there is a problem that the insertion/extraction force of the connector becomes large. Moreover, in the contact structure in which the contact faces make sliding contact with each other in the face direction along the insertion direction of the terminal to establish electrical connection, it is necessary to secure the contact area thereof by extending the contact area in the sliding contact direction along the longitudinal direction of the terminal, whereby there is a problem that the size of the connector becomes large.

The present invention has been made in consideration of the above-mentioned circumstances and is intended to provide a connector, the insertion/extraction force of which can be reduced and the size of which can be made compact.

Means for Solving the Problem

The above-mentioned object of the present invention is achieved by using the following configuration.

(1) A connector includes a female terminal having a terminal connection section to which a mating male terminal is electrically connected and a conductor connection section which continues to the terminal connection section and to which a conductor is electrically connected and an electric insulating female-side housing configured to hold the female terminal, wherein the female terminal includes a male terminal insertion and extraction opening bored in the terminal connection section extending in a direction intersecting with the fitting direction of the male terminal and formed into a flat plate shape, and a plurality of spring contact pieces extending to a center of the male terminal insertion and extraction opening from the fixed-side ends thereof fixed to an opening peripheral section of the male terminal insertion and extraction opening and that are disposed at predetermined intervals along the opening peripheral section of the male terminal insertion and extraction opening, so that the free-side ends of the spring contact pieces elastically make contact with the male terminal inserted into the male terminal insertion and extraction opening.

In the connector configured as described in the above-mentioned item (1), the male terminal insertion and extraction opening is bored in the terminal connection section of the female terminal extending in the direction intersecting with the fitting direction of the male terminal and formed into the flat plate shape, and the male terminal is inserted into the male terminal insertion and extraction opening. In other words, the male terminal is inserted into the flat plate-shaped terminal connection section of the female terminal in the vertical direction. In the opening peripheral section of the male terminal insertion and extraction opening, the free-side ends of the plurality of spring contact pieces are provided so as to extend to the center of the male terminal insertion and extraction opening. The spring contact pieces are pushed by the male terminal that is inserted into the male terminal insertion and extraction opening, thereby being deformed elastically so as to be pushed and bent in the insertion direction. The spring contact pieces having been deformed elastically make contact with the outer peripheral face of the male terminal while being pushed thereto by the elastic restoring force of the spring contact pieces. The spring contact pieces follow and make sliding contact with the outer peripheral face of the male terminal, thereby allowing the male terminal to be received into the male terminal insertion and extraction opening. As described above, each of the plurality of spring contact pieces is disposed as a cantilevered spring structure in which the fixed-side end and the free-side end are separated in the direction intersecting with (for example, orthogonal to) the insertion direction of the male terminal. With the plurality of spring contact pieces, the increase in the total contact load is suppressed although the contact load per unit area is large in the electrical connection state of the connector. Furthermore, since the male terminal is inserted into the flat plate-shaped terminal connection section of the female terminal in the vertical direction, electrical connection can be established in a space smaller than that in the conventional contact structure in which the contact faces make sliding contact with each other in the face direction along the insertion direction of the terminal to establish electrical connection, whereby the size of the connector can be made compact.

(2) The connector configured as described in the above-mentioned item (1), wherein the fixed-side ends are fixed to a face of the terminal connection section on the opposite side of a male terminal insertion side face of the terminal connection section, and the tip end sections of the free-side ends are disposed in a vicinity of the center of the male terminal insertion and extraction opening.

In the connector configured as described in the above-mentioned item (2), an excessive shearing force caused by the opening peripheral section and the male terminal, for example, in the case that the spring contact pieces are fixed to the male terminal insertion side face, are not exerted to the spring contact pieces. Hence, the fixing sections of the fixed-side ends of the spring contact pieces can be disposed at an appropriate position on the radial outside from the opening peripheral section of the male terminal insertion and extraction opening. In other words, the bending start positions of the spring contact pieces can be separated by a desired distance from the outer peripheral face of the male terminal so that an appropriate elastic force is obtained. As a result, an optimal spring characteristic can be secured easily.

(3) The connector configured as described in the above-mentioned item (1), wherein the fixed-side ends are fixed to the male terminal insertion side face of the terminal connection section, and the tip end sections of the free-side ends being bent slide on a face of the terminal connection section on the opposite side of the male terminal insertion side face of the terminal connection section when the male terminal is inserted.

In the connector configured as described in the above-mentioned item (3), the spring contact pieces, the fixed-side ends of which are fixed to the male terminal insertion side face, extend to the center of the male terminal insertion and extraction opening and are bent, and then the free-side ends thereof extend to the radial outside of the male terminal insertion and extraction opening along the face on the opposite side of the male terminal insertion side face. In other words, the spring contact pieces are formed to be long while having the L-shaped bent sections that approach the center of the male terminal insertion and extraction opening. In addition, the fixed-side ends on one sides of the L-shaped bent sections are fixed to the male terminal insertion side face, and the free-side ends on the other sides thereof are disposed on the face on the opposite side of the male terminal insertion side face. When the male terminal is inserted into the male terminal insertion and extraction opening, the L-shaped bent sections are pushed to the radial outside by the male terminal. At this time, the tip end sections of the free-side ends are moved to the radial outside while sliding on the face on the opposite side of the male terminal insertion side face. Hence, although the spring contact pieces are in a cantilevered state, the contact load with the male terminal can be increased without increasing the spring constants of the spring contact pieces, whereby the insertion and extraction force of the connector can be decreased.

(4) The connector configured as described in the above-mentioned item (3), wherein the fixed-side ends are fixed to the male terminal insertion side face of the terminal connection section, and the tip end sections of the free-side ends being bent are restricted from sliding on the opposite side of the male terminal insertion side of the terminal connection section.

In the connector configured as described in the above-mentioned item (4), the spring contact pieces, the fixed-side ends of which are fixed to the male terminal insertion side face, extend to the center of the male terminal insertion and extraction opening and are bent, and then the free-side ends thereof extend to the radial outside of the male terminal insertion and extraction opening along the face on the opposite side of the male terminal insertion side face. In other words, the spring contact pieces are formed to be long while having the L-shaped bent sections that approach the center of the male terminal insertion and extraction opening. In addition, the fixed-side ends on one sides of the L-shaped bent sections are fixed to the male terminal insertion side face, and the free-side ends on the other sides thereof are disposed on the opposite side of the male terminal insertion side. When the male terminal is inserted into the male terminal insertion and extraction opening, the L-shaped bent sections are pushed to the radial outside by the male terminal. Although the free-side ends are also moved to the radial outside at the same time, the tip end sections of the free-side ends make contact with, for example, the locking protrusion of the terminal connection section or the wall section of the female-side housing on the opposite side of the male terminal insertion side, whereby the sliding of the tip end sections are restricted. Hence, the spring contact piece completely becomes in a both-ends supported beam state and makes contact with the male terminal more securely. Furthermore, since the spring contact pieces are disposed as a spring structure in the both-ends supported beam state, the spring contact pieces are elastically deformed along the whole length of the long structure ranging from fixed-side ends to the free-side ends and can be elastically deformed in a range having an allowance for the elastic limit thereof. With this configuration, the spring contact piece hardly loses resilience.

Advantage of the Invention

With the connector according to the present invention, the insertion and extraction force of the connector can be decreased and the size of the connector can be made compact.

The present invention has been described above briefly. The details of the present invention will be further clarified by reading the description of the mode (hereafter referred to as "embodiment") for carrying out the invention described below referring to the accompanying drawings.

MODE FOR CARRYING OUT THE INVENTION

Figure 1:
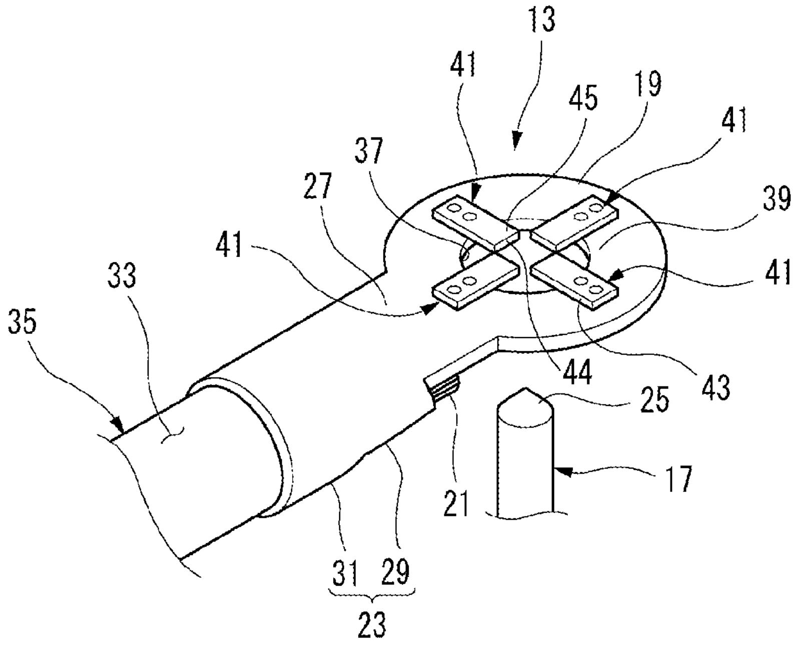
FIG. 1 is a perspective view showing the main sections of a connector according to a first embodiment of the present invention in a state before the female terminal and the male terminal thereof are not connected.

Embodiments according to the present invention will be described below referring to the drawings.

Figure 2:
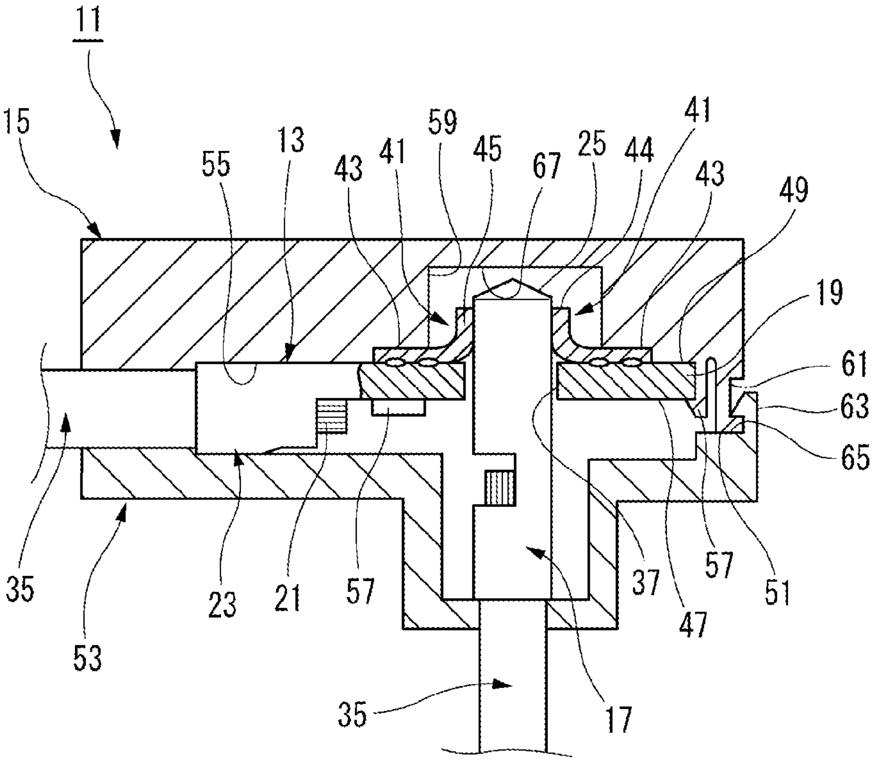
FIG. 2 is a vertical cross-sectional view showing the connector according to the first embodiment of the present invention in a state in which the female terminal and the male terminal thereof are connected.

As shown in FIGS. 1 and 2, a connector 11 according to the present invention includes a female terminal 13 and a female-side housing 15. The female terminal 13 has a terminal connection section 19 to which a mating male terminal 17 is electrically connected and a conductor connection section 23 which continues to the terminal connection section 19 and to which a conductor 21 is electrically connected. The male terminal 17 to be connected to the terminal connection section 19 is formed into a shape in which a taper 25 or a rounded face is provided at the tip end of a cylindrical terminal. Although a cylindrical terminal is taken as an example of the male terminal 17 according to this embodiment, a flat tab terminal can also be used.

The female terminal 13 according to the first embodiment has the terminal connection section 19 having a disc shape. The terminal connection section 19 extends in a direction intersecting with the fitting direction of the male terminal 17 and is formed into a flat plate shape, and the conductor connection section 23 continues to the terminal connection section 19. The conductor connection section 23 is connected to the terminal connection section 19 via a bottom plate section 27 extending from the terminal connection section 19. The conductor connection section 23 has a pair of conductor crimping pieces 29 rising upright from both side sections of the bottom plate section 27 and a pair of insulated electric wire crimping pieces 31. The conductor crimping pieces 29 are crimped to the conductor 21 of an electric wire 35 from which an insulation coating 33 is removed. The insulated electric wire crimping pieces 31 is crimped from above the insulation coating 33 and fixed to the electric wire 35. As a result, the female terminal 13 is crimped and fixed to the terminal of the electric wire 35.

Figure 3:
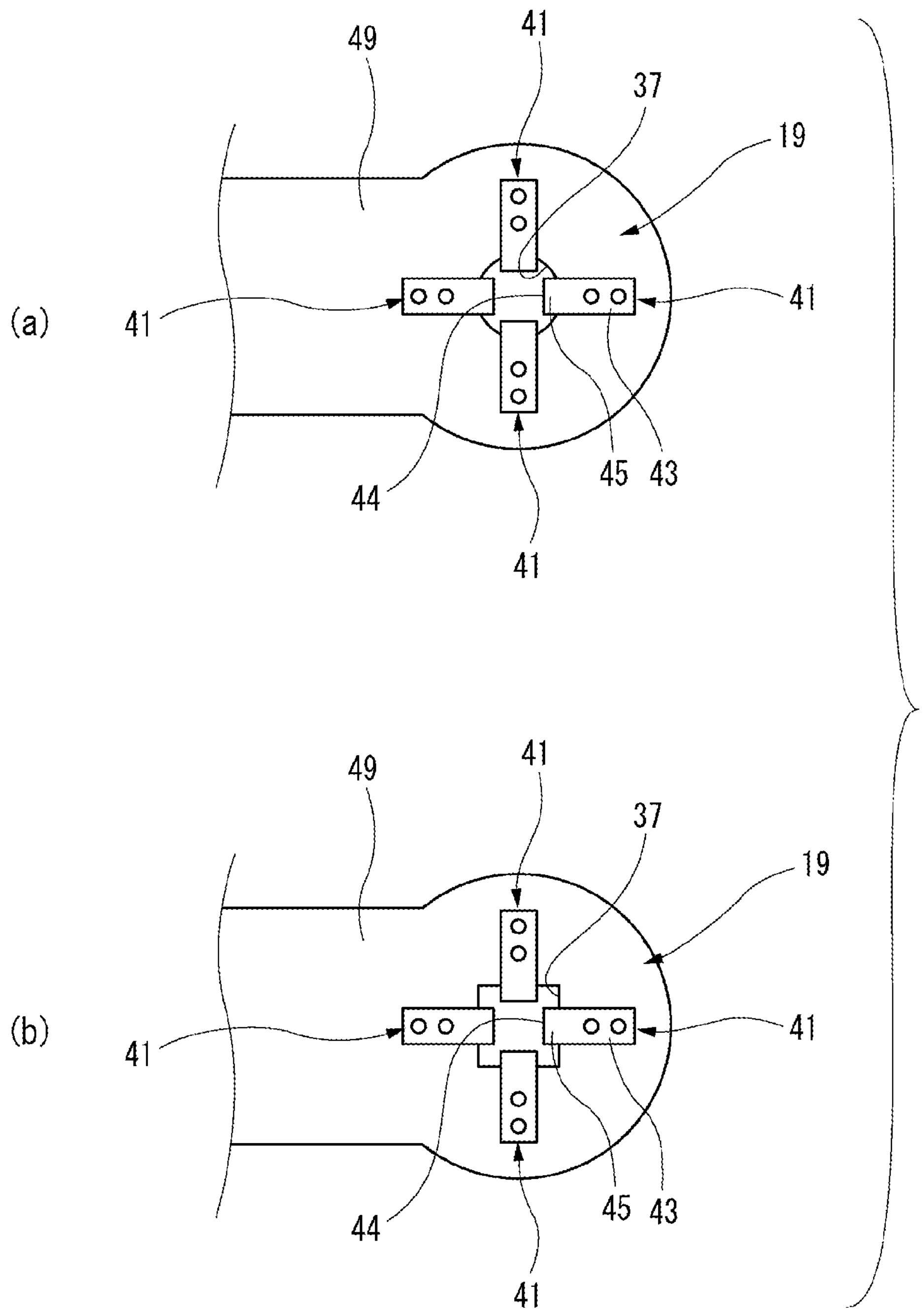
FIG. 3(*a*) is a plan view showing the main sections of the female terminal having a male terminal insertion and extraction opening corresponding to a cylindrical terminal, and FIG. 3(*b*) is a plan view showing the main sections of the female terminal having a male terminal insertion and extraction opening corresponding to a flat tab terminal.

A male terminal insertion and extraction opening 37 having a shape corresponding to the shape of the male terminal is bored in the terminal connection section 19. The male terminal insertion and extraction opening 37 is a circular hole shown in FIG. 3(*a*) in the case that the male terminal 17 is a cylindrical terminal, and the opening is a square hole in the case that the male terminal 17 is a flat tab terminal.

As shown in FIG. 1, in the opening peripheral section 39 of the male terminal insertion and extraction opening 37, a plurality (four in this embodiment) of spring contact pieces 41 are disposed at predetermined intervals (at equal intervals in this embodiment) along the opening peripheral section 39 of the male terminal insertion and extraction opening 37. The spring contact pieces 41 are extended from the fixed-side ends 43 fixed to the terminal connection section 19 to the center of the male terminal insertion and extraction opening. Furthermore, the spring contact pieces 41 protrude from the opening peripheral section 39 to the center of the male terminal insertion and extraction opening, whereby the free-side ends 45 thereof can elastically make contact with the male terminal 17 inserted into the male terminal insertion and extraction opening 37 (see FIG. 2).

As shown in FIGS. 1 and 2, the fixed-side end 43 of the spring contact piece 41 formed into a strip shape is fixed to the face 49 (the upper face in FIG. 2) on the opposite side of the male terminal insertion side face 47 of the terminal connection section 19, and the tip end section 44 of the free-side end 45 is disposed in the vicinity of the center of the male terminal insertion and extraction opening 37. The spring contact piece 41 according to the first embodiment is disposed on the face 49 on the opposite side of the male terminal insertion side face 47, thereby being suppressed from being bent as described later.

Since the four spring contact pieces 41 are disposed at equal intervals in the circumferential direction in the first embodiment, the spring contact pieces 41 are disposed at intervals of 90° in the circumferential direction. However, the minimum number of the spring contact pieces 41 is two. The maximum number thereof is not limited. For example, the spring contact pieces 41 having a linear shape and being large in number may be disposed in the circumferential direction and may also be disposed in multiple stages in the axial direction. With this configuration, the contact area thereof can be increased easily. The fixed-side ends 43 of the spring contact pieces 41 are fixed to the terminal connection section 19, for example, by spot welding or the like. Furthermore, the plurality of spring contact pieces 41 are not limited to those disposed at equal intervals along the opening peripheral section 39 of the male terminal insertion and extraction opening 37, but can be disposed variously, provided that they are disposed at predetermined intervals in which an elastic contact force can be applied uniformly to the male terminal 17 inserted into the male terminal insertion and extraction opening 37.

As shown in FIG. 2, the female-side housing 15 according to the first embodiment is formed of an electric insulating synthetic resin material and holds the female terminal 13. A housing connection face 51 (the lower face in FIG. 2) is formed on the female-side housing 15. The housing connection face 51 makes contact with a male-side housing 53 in which the male terminal 17 is accommodated. A female terminal accommodating concave section 55 is provided so as to be recessed on the housing connection face 51. The female terminal accommodating concave section 55 is formed into a shape corresponding to the external shape of the female terminal 13, thereby accommodating the female terminal 13 without rattling. On the inner wall face of the female terminal accommodating concave section 55, a plurality of removal restricting protrusions 57 are provided so as to protrude, and the removal restricting protrusions 57 to which the outer peripheral edge of the female terminal 13 is locked restrict the dropping of the female terminal 13 from the female terminal accommodating concave section 55 (see FIG. 5).

A male terminal accommodating section 59 is provided on the bottom face of the female terminal accommodating concave section 55. The male terminal accommodating section 59 is provided so as to be recessed corresponding to the male terminal insertion and extraction opening 37 of the female terminal 13 to be accommodated, thereby demarcating a space in which the spring contact pieces 41 can bend. In other words, the male terminal accommodating section 59 is configured so as to include a bending-use space in which the spring contact pieces 41 are allowed to be deformed in addition to the space for accommodating the male terminal 17.

On the outer peripheral face of the female-side housing 15, a locking hole 61 is formed. The locking protrusion of a locking arm 63 protruding from the male-side housing 53 is locked to the locking hole 61. When a male-side housing step section 65 makes contact with the housing connection face 51, the locking protrusion of the locking arm 63 is locked to the locking hole 61, whereby the female-side housing 15 and the male-side housing 53 are connected to each other inseparably.

When the female-side housing 15 and the male-side housing 53 are connected to each other in the connector, the male terminal 17 held in the male-side housing 53 is disposed at a predetermined depth in the male terminal accommodating section 59. At this time, it is preferable that the male terminal 17 should be disposed so that a clearance is provided between the tip end section thereof and the bottom face 67 of the male terminal accommodating section.

Next, the operation of the connector 11 according to the first embodiment having the above-mentioned configuration will be described.

In the connector 11 according to the first embodiment, the male terminal insertion and extraction opening 37 is bored in the terminal connection section 19 of the female terminal 13 extending in a direction intersecting with the fitting direction of the male terminal 17 and formed into a flat plate shape, and the male terminal 17 is inserted into the male terminal insertion and extraction opening 37. In other words, the male terminal 17 is inserted into the flat plate-shaped terminal connection section 19 of the female terminal 13 in the vertical direction.

Figure 4:
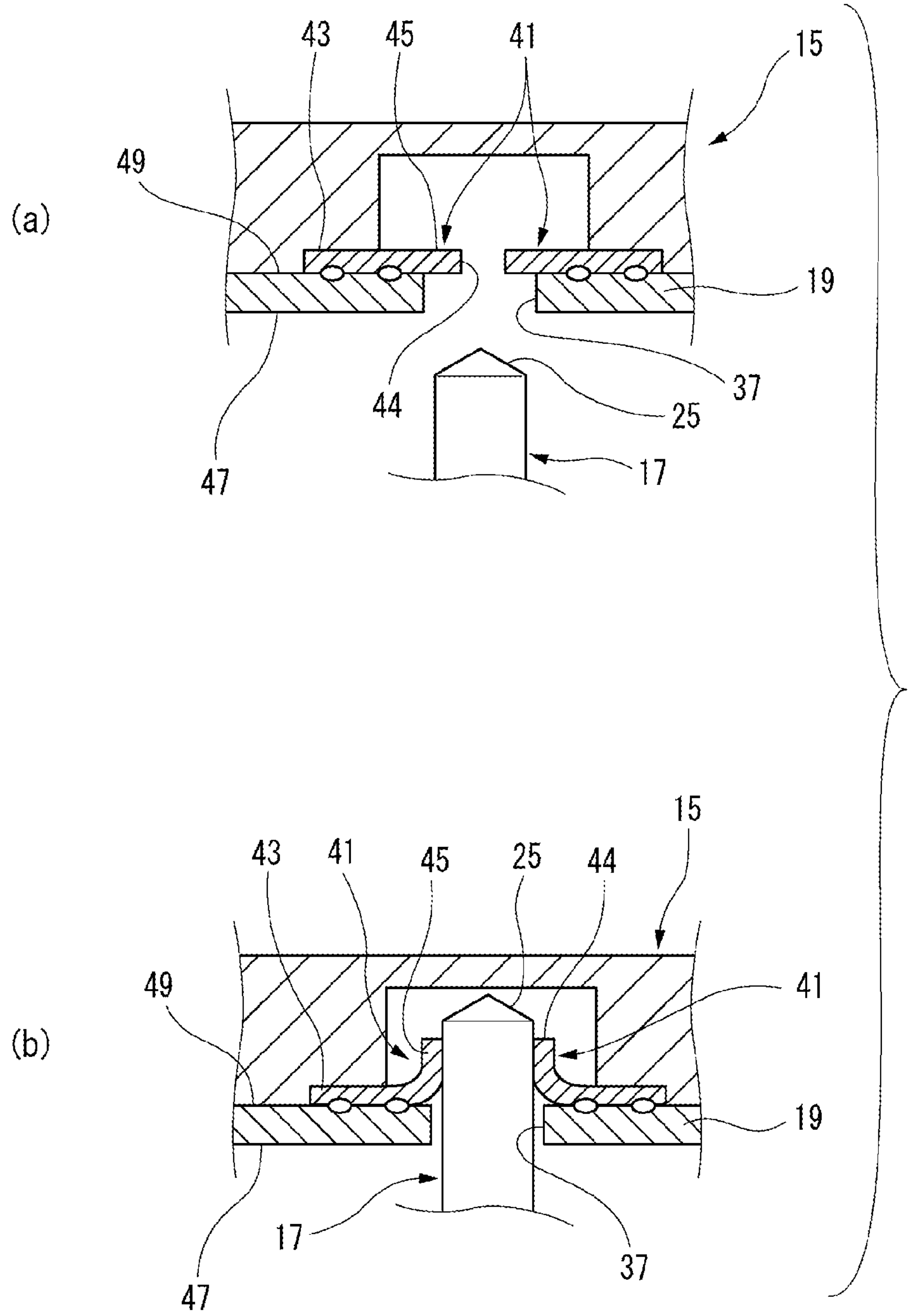
FIG. 4(*a*) is a vertical cross-sectional view showing the main sections of the connector shown in FIG. 2 in a state before the insertion of the male terminal, and FIG. 4(*b*) is a vertical cross-sectional view showing the main sections shown in FIG. 4(*a*) in a state after the insertion of the male terminal.

In the opening peripheral section 39 of the male terminal insertion and extraction opening 37, the free-side ends 45 of the four spring contact pieces 41 are provided so as to extend to the center of the male terminal insertion and extraction opening as shown in FIG. 4(*a*). When the male terminal 17 is inserted into the male terminal insertion and extraction opening 37 as shown in FIG. 4(*b*), the spring contact pieces 41 are deformed along the taper 25 of the male terminal 17, and the spring contact pieces 41 follow and make contact with the outside face of the male terminal 17. At this time, the spring contact pieces 41 are pushed by the male terminal 17 that is inserted into the male terminal insertion and extraction opening 37, thereby being deformed elastically so as to be pushed and bent in the insertion direction. The spring contact pieces 41 having been deformed elastically make contact with the outer peripheral face of the male terminal 17 while being pushed thereto by the elastic restoring force of the spring contact pieces.

The spring contact pieces 41 follow and make sliding contact with the outer peripheral face of the male terminal 17, thereby allowing the male terminal 17 to be received into the male terminal insertion and extraction opening 37. As described above, each of the four spring contact pieces 41 is disposed as a cantilevered spring structure in which the fixed-side end 43 and the free-side end 45 are separated in the direction intersecting with (orthogonal to, in the first embodiment) the insertion direction of the male terminal 17.

Figure 9:
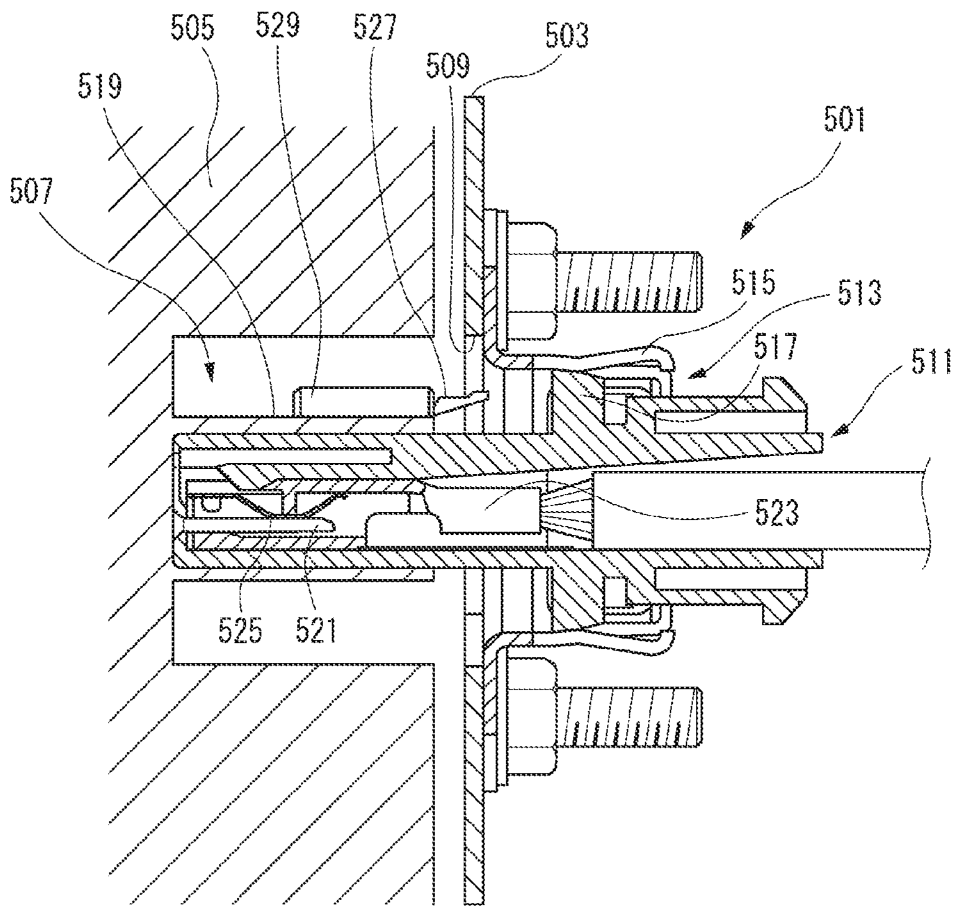
FIG.9 Prior Art
FIG. 9 is a vertical cross-sectional view showing the main sections of the conventional shield connector.

With the four spring contact pieces 41, the increase in the total contact load is suppressed although the contact load per unit area is large in the electrical connection state thereof. Furthermore, since the male terminal 17 is inserted into the flat plate-shaped terminal connection section 19 of the female terminal 13 in the vertical direction, electrical connection can be established in a space smaller than that in the conventional contact structure (see FIG. 9) in which the contact faces make sliding contact with each other in the face direction along the insertion direction of the terminal to establish electrical connection, whereby the size of the connector can be made compact.

Additionally, in the connector 11 according to the first embodiment, the fixed-side end 43 of the spring contact piece 41 is fixed on the face 49 on the opposite side of the male terminal insertion side face 47 of the female terminal 13, and the free-side end 45 thereof is disposed in the vicinity of the center of the male terminal insertion and extraction opening. Hence, an excessive shearing force caused by the opening peripheral section 39 and the male terminal 17, for example, in the case that the spring contact piece 41 is fixed to the male terminal insertion side face 47, is not exerted to the spring contact piece 41. Besides, the fixing section of the fixed-side end 43 of the spring contact piece 41 can be disposed at an appropriate position on the radial outside from the opening peripheral section 39 of the male terminal insertion and extraction opening 37. In other words, the bending start position of the spring contact piece 41 can be separated by a desired distance from the outer peripheral face of the male terminal 17 so that an appropriate elastic force is obtained. As a result, an optimal spring characteristic can be secured easily.

Furthermore, in the connector 11 according to the first embodiment, the male terminal accommodating section 59 is provided in the female-side housing 15 for holding the female terminal 13. A space for allowing bending in which the spring contact pieces 41 that are deformed as the male terminal 17 having entered through the terminal connection section 19 of the female terminal 13 is inserted can be bent, is provided in the male terminal accommodating section 59 of the female-side housing 15. Hence, the spring contact piece 41 can be deformed freely.

Moreover, since the spring contact pieces 41 being in the state of elastically making contact with the male terminal 17 are disposed in the space for allowing bending, the spring contact pieces 41 are covered with the female-side housing 15. Hence, the release of the electrical connection due to the contact with other members is prevented and the reliability of the electrical connection is ensured.

Next, a connector 69 according to a second embodiment of the present invention will be described.

Figure 5:
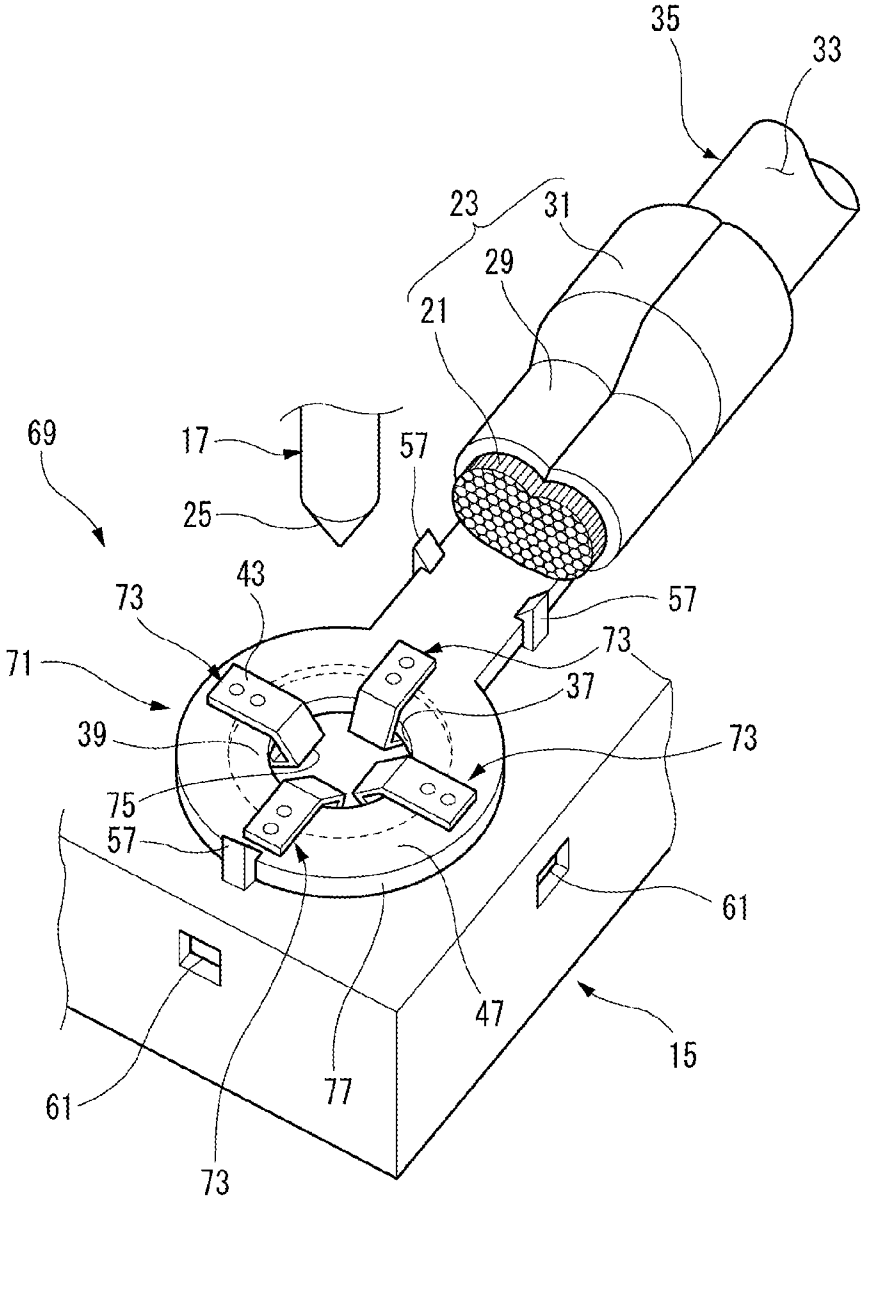
FIG. 5 is a perspective view showing main sections of a connector according to a second embodiment of the present invention in a state before the female terminal and the male terminal thereof are not connected.
Figure 6:
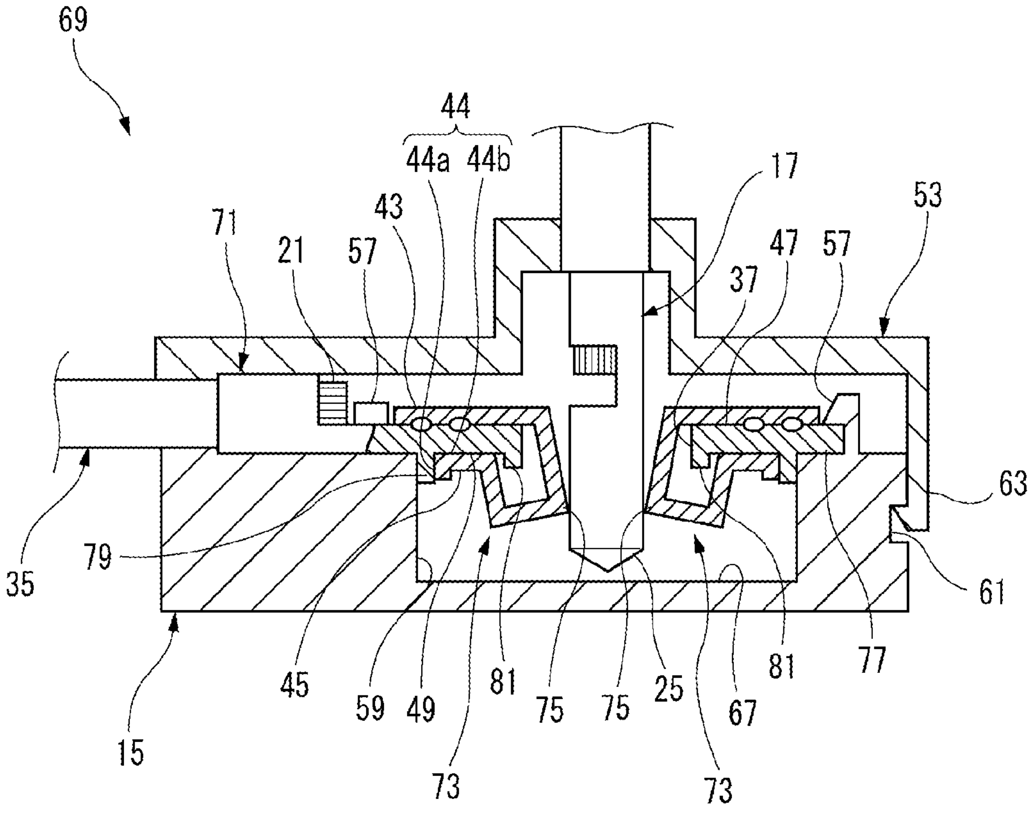
FIG. 6 is a vertical cross-sectional view showing the connector according to the second embodiment of the present invention in a state in which the female terminal and the male terminal thereof are connected.
Figure 7:
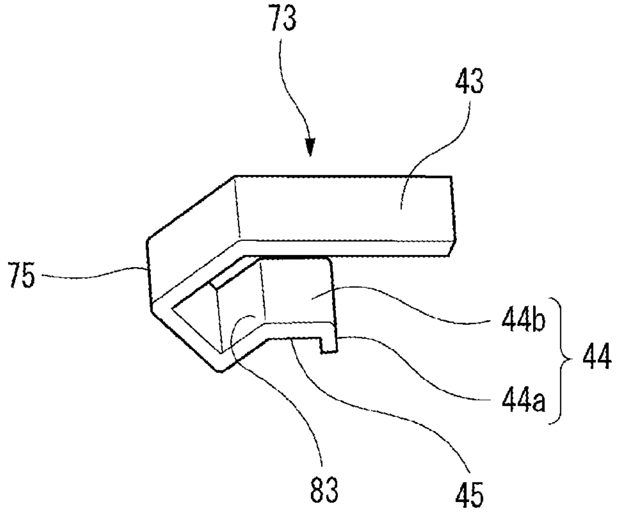
FIG. 7(*a*) is an overall perspective view showing the spring contact piece shown in FIG. 5, and FIG. 7(*b*) is a perspective view, partly cut away, showing the main sections of the terminal connection section of the female terminal shown in FIG. 5.
Figure 7:
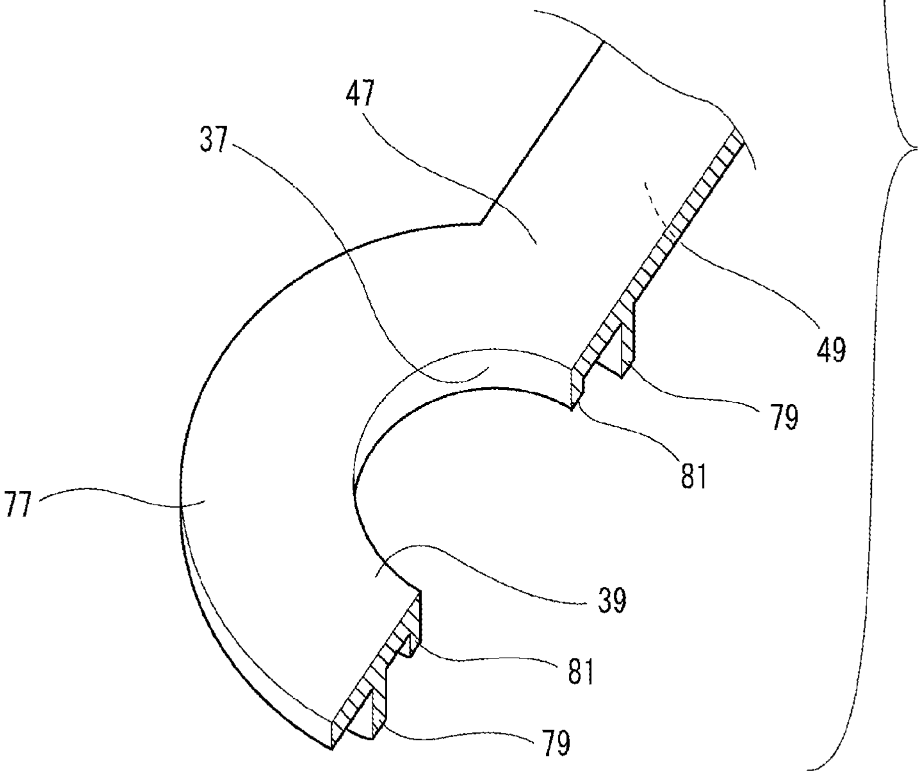

As shown in FIGS. 5 and 6, in the connector 69 according to the second embodiment of the present invention, the spring contact piece 73 thereof has an L-shaped bent section 75 (see FIG. 7(*a*)). In the connector 69 according to the second embodiment, the components thereof nearly the same as the components of the connector 11 according to the first embodiment are designated by the same numerals and their detailed descriptions are omitted.

The fixed-side end 43 of the spring contact piece 73 is fixed to the male terminal insertion side face 47 of a terminal connection section 77 by spot welding or the like. The tip end section 44 of a free-side end 45 being bent is disposed on the side 49 on the opposite side of the male terminal insertion side face 47 of the terminal connection section 77. When the male terminal 17 is inserted into the male terminal insertion and extraction opening 37, the tip end section 44 of the free-side end 45 according to the second embodiment is moved to the radial outside while the sliding face 44*b* thereof slides along the face 49 on the opposite side, and the locking face 44*a* thereof makes contact with a locking protrusion 79 protruding from the face 49 on the opposite side, whereby the sliding is restricted (see FIG. 6).

Figure 8:
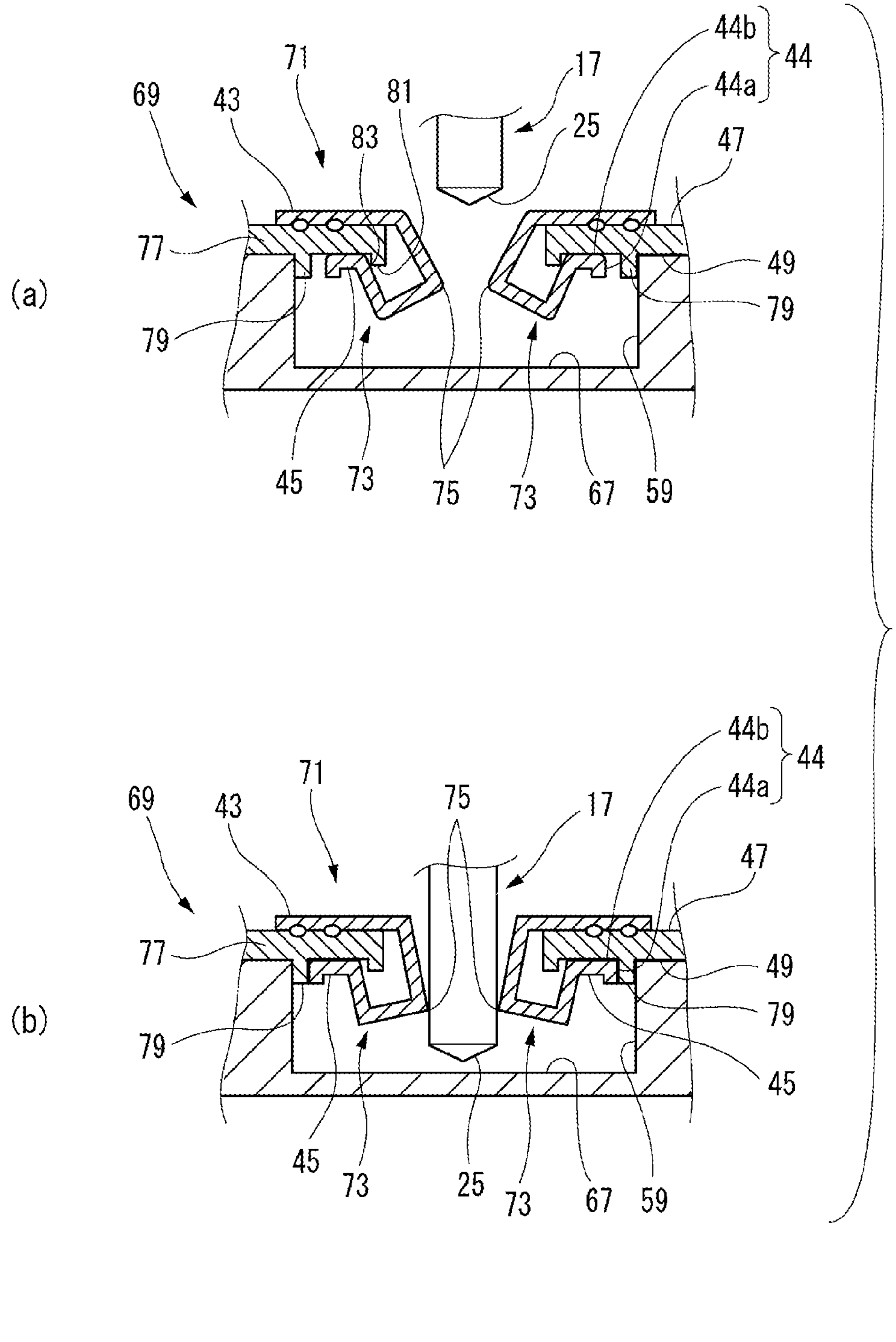
FIG. 8(*a*) is a vertical cross-sectional view showing the main sections of the connector shown in FIG. 6 in a state before the insertion of the male terminal, and FIG. 8(*b*) is a vertical cross-sectional view showing the main sections shown in FIG. 8(*a*) in a state after the insertion of the male terminal.

The locking protrusion 79 of the terminal connection section 77 may be formed continuously into a ring shape along the outside of the male terminal insertion and extraction opening 37 or may be formed of a plurality of divided arcuate protrusions. On the terminal connection section 77 inside the ring-shaped locking protrusion 79, a peripheral wall 81 rising upright on the opening peripheral section 39 is formed continuously (see FIG. 7(*b*)). As shown in FIG. 8(*a*), the peripheral wall 81 makes contact with the end bent section 83 of the spring contact piece 73. Since the end bent section 83 makes contact with the peripheral wall 81, the spring contact piece 73 can be restricted from approaching the center of the male terminal insertion and extraction opening more than necessary. In other words, since the movement of the end bent section 83 is restricted by the peripheral wall 81, the L-shaped bent section 75 is positioned at the optimal position where the male terminal 17 can be received easily.

The operation of the connector 69 according to the second embodiment having the above-mentioned configuration will be described.

In the connector 69 according to the second embodiment, the fixed-side end 43 of the spring contact piece 73 is fixed to the male terminal insertion side face 47 as shown in FIG. 8(*a*). The spring contact piece 73, the fixed-side end 43 of which is fixed to the male terminal insertion side face 47, extends to the center of the male terminal insertion and extraction opening and is bent, and then the free-side end 45 thereof extends to the radial outside of the male terminal insertion and extraction opening 37 along the face 49 on the opposite side of the male terminal insertion side face 47. In other words, the spring contact piece 73 is formed to be long while having the L-shaped bent section 75 that approaches the center of the male terminal insertion and extraction opening.

In addition, the fixed-side end 43 on one side of the L-shaped bent section 75 is fixed to the male terminal insertion side face 47, and the free-side end 45 on the other side thereof is disposed on the face 49 on the opposite side of the male terminal insertion side face 47. As shown in FIG. 8(*b*), when the male terminal 17 is inserted into the male terminal insertion and extraction opening 37, the L-shaped bent section 75 is pushed to the radial outside by the male terminal 17. Although the free-side end 45 is also moved to the radial outside at the same time, the tip end section 44 of the free-side end 45 is moved to the radial outside while the sliding face 44*b* slides on the face 49 on the opposite side. Furthermore, the sliding of the tip end section 44 of the free-side end 45 having moved to the radial outside more than a predetermined distance is restricted when the locking face 44*a* thereof makes contact with the locking protrusion 79 of the terminal connection section 77 on the opposite side of the male terminal insertion side.

Hence, in the connector 69 according to the second embodiment, with the four spring contact pieces 73, the increase in the total contact load is suppressed although the contact load per unit area is large in the electrical connection state. Furthermore, since the male terminal 17 is inserted into the flat plate-shaped terminal connection section 77 of the female terminal 71 in the vertical direction, electrical connection can be established in a space smaller than that in the conventional contact structure (see FIG. 9) in which the contact faces make sliding contact with each other in the face direction along the insertion direction of the terminal to establish electrical connection, whereby the size of the connector can be made compact.

What's more, in the spring contact piece 73 according to the second embodiment, the sliding face 44*b* formed at the tip end section 44 of the free-side ends 45 is moved to the radial outside while sliding along the face 49 on the opposite side; hence, although the spring contact piece is in a cantilevered state, the contact load with the male terminal 17 can be increased without increasing the spring constant of the spring contact piece, whereby the insertion and extraction force of the connector can be decreased.

Furthermore, the sliding of the tip end section 44 of the free-side end 45 having moved to the radial outside more than the predetermined distance is restricted when the locking face 44*a* thereof makes contact with the locking protrusion 79 of the terminal connection section 77 on the opposite side of the male terminal insertion side. Hence, the spring contact piece 73 completely becomes in a both-ends supported beam state and makes contact with the male terminal 17 more securely. Furthermore, since the spring contact piece 73 is disposed as a spring structure in the both-ends supported beam state, the spring contact piece 73 is elastically deformed along the whole length of the long structure ranging from the fixed-side end 43 to the free-side end 45 and can be elastically deformed in a range having an allowance for the elastic limit thereof. With this configuration, the spring contact piece 73 hardly loses resilience, and high electrical connection reliability can be obtained for a long time. Although the sliding of the tip end section 44 of the free-side end 45 having moved to the radial outside more than the predetermined distance is restricted when the locking face 44*a* makes contact with the locking protrusion 79 of the terminal connection section 77, the present invention is not limited to this configuration, but it is possible to have a configuration in which the sliding of the tip end section is restricted by the wall section or the like of the female-side housing on the opposite side of the male terminal insertion side.

Accordingly, with the connector 11 according to the first embodiment or the connector 69 according to the second embodiment, the insertion and extraction force of the connector can be decreased and the size of the connector can be made compact.

The characteristics of the above-mentioned embodiments of the connector according to the present invention will be briefly summarized and listed in the following items [1] to [4].

[1] A connector (11) including:

a female terminal (13) including a terminal connection section (19) to which a mating male terminal (17) is electrically connected; and a conductor connection section (23) which continues to the terminal connection section (19) and to which a conductor (21) is electrically connected; and an electric insulating female-side housing (15) configured to hold the female terminal (13); and wherein the female terminal (13) including:

a male terminal insertion and extraction opening (37) bored in the terminal connection section (19) extending in a direction intersecting with the fitting direction of the male terminal (17) and formed into a flat plate shape; and a plurality of spring contact pieces (41) that extend to a center of the male terminal insertion and extraction opening from fixed-side ends (43) thereof fixed to the opening peripheral section (39) of the male terminal insertion and extraction opening (37) and that are disposed at predetermined intervals along the opening peripheral section (39) of the male terminal insertion and extraction opening (37), so that free-side ends (45) of the spring contact pieces elastically make contact with the male terminal (17) inserted into the male terminal insertion and extraction opening (37).

[2] The connector (11) configured as described in the above-mentioned item [1], wherein the fixed-side ends (43) are fixed to a face (49) of the terminal connection section (19) on the opposite side of a male terminal insertion side face (47) of the terminal connection section (19); and wherein tip end sections (44) of the free-side ends (45) are disposed in a vicinity of the center of the male terminal insertion and extraction opening (37).

[3] The connector (69) configured as described in the above-mentioned item [1], wherein the fixed-side ends (43) are fixed to a male terminal insertion side face (47) of the terminal connection section (77); and wherein tip end sections (44) of the free-side ends (45) being bent slide on a face (49) of the terminal connection section (77) on the opposite side of the male terminal insertion side face (47) of the terminal connection section (77) when the male terminal (17) is inserted.

[4] The connector (69) configured as described in the above-mentioned item [3], wherein the fixed-side ends (43) are fixed to the male terminal insertion side face (47) of the terminal connection section (77); and wherein the tip end sections (44) of the free-side ends (45) being bent are restricted from sliding on the opposite side of a male terminal insertion side of the terminal connection section (77).

However, the present invention is not limited to the above-mentioned embodiments, but can be modified or improved as necessary. In addition, the materials, shapes, dimensions, quantities, arrangement positions, etc. of the respective components in the above-mentioned embodiments may be arbitrary and not limited, provided that the present invention can be achieved.

In addition, the present application is based on Japanese Patent Application (patent application No. 2013-094463) filed on Apr. 26, 2013, and the contents of which are herein incorporated by reference.

INDUSTRIAL APPLICABILITY

With the connector that can be provided by the present invention, the insertion and extraction force of the connector can be reduced and the size of the connector can be made compact.

DESCRIPTION OF REFERENCE NUMERALS AND SIGNS

11 . . . connector
13 . . . female terminal
15 . . . female-side housing
17 . . . male terminal
19 . . . terminal connection section
21 . . . conductor
23 . . . conductor connection section
37 . . . male terminal insertion and extraction opening
39 . . . opening peripheral section
41 . . . spring contact piece
43 . . . fixed-side end
44 . . . tip end section
45 . . . free-side end
47 . . . male terminal insertion side face
49 . . . face on the opposite side
59 . . . male terminal accommodating section

The invention claimed is:

1. A connector comprising:

a female terminal comprises:

a terminal connection section configured to be electrically connected to a mating male terminal; and a conductor connection section which continues to the terminal connection section and to which a conductor is electrically connected; and an electric insulating female-side housing configured to hold the female terminal, wherein the female terminal comprises:

a male terminal insertion and extraction opening bored in the terminal connection section extending in a direction intersecting with the fitting direction of the male terminal and formed into a flat plate shape; and a plurality of spring contact pieces that extend to a center of the male terminal insertion and extraction opening from fixed-side ends thereof fixed to an opening peripheral section of the male terminal insertion and extraction opening and that are disposed at predetermined intervals along the opening peripheral section of the male terminal insertion and extraction opening, so that free-side ends of the spring contact pieces elastically make contact with the male terminal when the male terminal is inserted into the male terminal insertion and extraction opening, wherein the fixed-side ends are fixed to a male terminal insertion side face of the terminal connection section; and wherein tip end sections of the free-side ends being bent slide on a face of the terminal connection section on the opposite side of the male terminal insertion side face of the terminal connection section when the male terminal is inserted.

2. The connector according to claim 1, wherein the fixed-side ends are fixed to the male terminal insertion side face of the terminal connection section; and wherein the tip end sections of the free-side ends being bent are restricted from sliding on the opposite side of a male terminal insertion side of the terminal connection section.

* * * * *